United States Patent
Suits et al.

(10) Patent No.: US 12,230,027 B2
(45) Date of Patent: *Feb. 18, 2025

(54) CATASTROPHE ANALYSIS VIA REALTIME WINDSPEED AND EXPOSURE VISUALIZATION

(71) Applicant: STATE FARM MUTUAL AUTOMOBILE INSURANCE COMPANY, Bloomington, IL (US)

(72) Inventors: Emily Suits, Atlanta, GA (US); David J. Podwojski, Bloomington, IL (US); Veronica Ann McNear, Fort Mill, SC (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/618,688

(22) Filed: Mar. 27, 2024

(65) Prior Publication Data

US 2024/0242498 A1     Jul. 18, 2024

Related U.S. Application Data

(60) Continuation of application No. 18/199,005, filed on May 18, 2023, now Pat. No. 11,972,608, which is a
(Continued)

(51) Int. Cl.
*G06V 20/10*     (2022.01)
*B64C 39/02*     (2023.01)
(Continued)

(52) U.S. Cl.
CPC .......... *G06V 20/176* (2022.01); *B64C 39/024* (2013.01); *G06F 3/04842* (2013.01);
(Continued)

(58) Field of Classification Search
CPC .... G06V 20/176; G06V 10/764; G06V 20/17; B64C 39/024; G06F 3/04842;
(Continued)

(56) References Cited

U.S. PATENT DOCUMENTS 9,057,746 B1   6/2015   Houlette et al.
9,152,737 B1   10/2015  Micali et al.
(Continued)

FOREIGN PATENT DOCUMENTS

CN   111626536 A   9/2020
CN   113138558 A   7/2021
(Continued)

OTHER PUBLICATIONS

U.S. Appl. No. 17/575,566, Catastrophe Analysis via Realtime Windspeed and Exposure Visualization, filed Jan. 13, 2022.
(Continued)

*Primary Examiner* — Yuen Wong
(74) *Attorney, Agent, or Firm* — MARSHALL, GERSTEIN & BORUN LLP

(57) ABSTRACT

A catastrophe analysis computing system includes a processor; an electronic network; and a memory having stored thereon non-transitory computer-executable instructions that, when executed by the processor, cause the system to: cause a client device to receive a exposure map layer; cause a filter graphical user interface and wind speed layers to be displayed in a graphical user interface; receive an input; and update the map graphical user interface. In another aspect, a method includes causing a client device to receive an exposure map layer; causing a filter graphical user interface and wind speed layers to be displayed in a graphical user interface; receiving an input; and updating the map graphical user interface. A method includes receiving an exposure
(Continued)

map; displaying a filter graphical user interface; receiving an input; and updating a map graphical user interface.

20 Claims, 6 Drawing Sheets

Related U.S. Application Data continuation of application No. 17/575,566, filed on Jan. 13, 2022, now Pat. No. 11,682,202, which is a division of application No. 16/244,396, filed on Jan. 10, 2019, now abandoned.

(51) Int. Cl.
| | |
|---|---|
| *G06F 3/04842* | (2022.01) |
| *G06F 3/04847* | (2022.01) |
| *G06F 3/04883* | (2022.01) |
| *G06F 18/22* | (2023.01) |
| *G06Q 40/08* | (2012.01) |
| B64U 101/30 | (2023.01) |
| B64U 101/35 | (2023.01) |
| H04L 67/01 | (2022.01) |
| H04L 67/55 | (2022.01) |

(52) U.S. Cl.
CPC ...... *G06F 3/04847* (2013.01); *G06F 3/04883* (2013.01); *G06F 18/22* (2023.01); *G06Q 40/08* (2013.01); B64U 2101/30 (2023.01); B64U 2101/35 (2023.01); G06F 2203/04806 (2013.01); G06F 2203/04808 (2013.01); *H04L 67/01* (2022.05); *H04L 67/55* (2022.05)

(58) Field of Classification Search
CPC .. G06F 3/04847; G06F 3/04883; G06F 18/22; G06F 2203/04806; G06F 2203/04808; G06Q 40/08; B64U 2101/30; B64U 2101/35; H04L 67/01; H04L 67/55
See application file for complete search history.

(56) References Cited

U.S. PATENT DOCUMENTS

| | | | |
|---|---|---|---|
| 9,443,195 | B2 | 9/2016 | Micali et al. |
| 9,489,397 | B1 | 11/2016 | Olson |
| 9,609,003 | B1 | 3/2017 | Chmielewski et al. |
| 9,699,529 | B1 | 7/2017 | Petri et al. |
| 9,739,813 | B2 | 8/2017 | Houlette et al. |
| 9,798,979 | B2 | 10/2017 | Fadell et al. |
| 9,800,958 | B1 | 10/2017 | Petri et al. |
| 9,942,630 | B1 | 4/2018 | Petri et al. |
| 10,102,584 | B1 | 10/2018 | Devereaux et al. |
| 10,142,394 | B2 | 11/2018 | Chmielewski et al. |
| 10,198,771 | B1 | 2/2019 | Madigan et al. |
| 10,296,978 | B1 | 5/2019 | Corder et al. |
| 10,332,059 | B2 | 6/2019 | Matsuoka et al. |
| 10,469,282 | B1 | 11/2019 | Konrardy et al. |
| 10,586,177 | B1 | 3/2020 | Choueiter et al. |
| 10,664,922 | B1 | 5/2020 | Madigan et al. |
| 10,699,346 | B1 | 6/2020 | Corder et al. |
| 10,699,348 | B1 | 6/2020 | Devereaux et al. |
| 10,735,829 | B2 | 8/2020 | Petri et al. |
| 10,740,691 | B2 | 8/2020 | Choueiter et al. |
| 10,750,252 | B2 | 8/2020 | Petri et al. |
| 10,796,557 | B2 | 10/2020 | Sundermeyer et al. |
| 10,802,477 | B1 | 10/2020 | Konrardy et al. |
| 10,804,700 | B2 | 10/2020 | Cohen et al. |
| 10,818,105 | B1 | 10/2020 | Konrardy et al. |
| 10,907,844 | B2 | 2/2021 | Ribbich et al. |
| 10,997,663 | B1 | 5/2021 | Wyatt et al. |
| 11,003,334 | B1 | 5/2021 | Conway et al. |
| 11,037,342 | B1 * | 6/2021 | Agnew ............... G06F 3/04847 |
| 11,100,594 | B1 | 8/2021 | West et al. |
| 11,164,257 | B1 | 11/2021 | Devereaux et al. |
| 11,232,873 | B1 | 1/2022 | Aspro et al. |
| 11,277,465 | B2 | 3/2022 | Chmielewski et al. |
| 11,348,193 | B1 | 5/2022 | Konrardy et al. |
| 11,417,212 | B1 | 8/2022 | Farooqui et al. |
| 2009/0265193 | A1 | 10/2009 | Collins et al. |
| 2014/0266669 | A1 | 9/2014 | Fadell et al. |
| 2015/0061859 | A1 | 3/2015 | Matsuoka et al. |
| 2015/0347910 | A1 | 12/2015 | Fadell et al. |
| 2019/0251520 | A1 | 8/2019 | Bentley, III et al. |
| 2021/0279811 | A1 | 9/2021 | Waltman et al. |
| 2021/0312789 | A1 | 10/2021 | Linn |
| 2022/0101275 | A1 | 3/2022 | Aspro et al. |

FOREIGN PATENT DOCUMENTS

| | | |
|---|---|---|
| JP | 2003157357 A | 5/2003 |
| KR | 20150129845 A | 11/2015 |
| WO | WO-2014159131 A2 | 10/2014 |
| WO | WO-2016081511 A2 | 5/2016 |
| WO | WO-2021087185 A1 | 5/2021 |

OTHER PUBLICATIONS

Notice of Allowance for U.S. Appl. No. 18/199,005 dated Dec. 28, 2023.

Non-Final Office Action for U.S. Appl. No. 16/244,396 dated Feb. 3, 2022.

* cited by examiner

| | Deductible | Policy in force | COV A, B, C, BSI | CIF Sewer Drain | Avg Windspeed | Max Windspeed |
|---|---|---|---|---|---|---|
| 1 | 1% | 167 | 15,903,210 | 52 | 60.4 | 64 |
| 2 | 1%, 1000 Min | 2 | 797,350 | 1 | 62 | 62 |
| 3 | 1000 | 140 | 11,227,000 | 62 | 60.5 | 61 |
| 4 | 2% | 238 | 166,853,440 | 142 | 60 | 60 |
| 5 | 2000 | 18 | 1,757,450 | 7 | 60 | 60 |
| 6 | 3% | 20 | 12,434,770 | 12 | 60 | 60 |
| 7 | 3000 | 2 | 905,535 | 0 | 60 | 60 |
| 8 | 4000 | 2 | 857,460 | 1 | 60 | 60 |
| 9 | 5% | 21 | 9,470,470 | 9 | 60.4 | 61 |
| 10 | 500 | 1,165 | 80,390,390 | 470 | 60.3 | 61 |

Showing 1 to 10 of 25 entries

Previous  1  2  Next

FIG. 5

CATASTROPHE ANALYSIS VIA REALTIME WINDSPEED AND EXPOSURE VISUALIZATION

CROSS-REFERENCE TO RELATED APPLICATIONS

This application is a continuation of U.S. patent application Ser. No. 18/199,005, filed on May 18, 2023, which is a continuation of U.S. patent application Ser. No. 17/575,566, filed on Jan. 13, 2022, which is a divisional of U.S. patent application Ser. No. 16/244,396, filed on Jan. 10, 2019, the disclosures of which are incorporated by reference herein in their respective entireties.

FIELD OF THE DISCLOSURE

The present disclosure generally relates to a system and method for catastrophe analysis, more particularly, to providing a user with visualizations of weather data to facilitate a user's understanding of catastrophic risk from weather effects.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Weather-related catastrophes are significant events for policy-holders and insurers alike. Hurricanes, tornadoes, and hailstorms bring strong winds, rain and damaging precipitation that may damage and/or destroy large swaths of homes, vehicles and other property. Large storms are unpredictable and represent significant actuarial risk to large geographic areas that may include many (e.g., thousands) of policy holders. For example, in 2017, Hurricane Irma strengthened to a category-5 storm within the last 24 hours before making landfall, and the storm path shifted from Miami, FL to Tampa, FL, with damage estimates fluctuating from $1 million to $1.3 billion.

At present, insurers have difficulty determining how varying windspeed levels, storm surge levels and home construction variables may affect segments of insured customers and overall actuarial risk. Insurers also lack the ability to assess weather-related catastrophes in an ongoing and realtime basis, preventing the industry from maximizing preventative action and the staging of resources in the pre-catastrophe stage, and preventing the industry from effective provision of services to customers in the critical post-storm period. Currently, insurers may retrieve storm information only intermittently, and human analysts may be required to manually map and manually analyze large volumes of data to deploy strategic resources using methods that are inefficient and do not encompass other features.

BRIEF SUMMARY

In one aspect, a catastrophe analysis computing system includes one or more processors; an electronic network; and one or more memories having stored thereon non-transitory computer-executable instructions that, when executed by the one more processors, cause the computing system to: (i) cause, via the one or more processors, a client device to receive an exposure map layer including insurance policy counts and one or more wind speed bands depicting geographical areas receiving or predicted to receive winds; (ii) cause, via the one or more processors, a filter graphical user interface and the one or more wind speed band map layers to be displayed in a map graphical user interface; (iii) receive, via an input/output user interface, an input of a user; and (iv) cause, based on the input of the user, the map graphical user interface to be updated.

In another aspect, a computer-implemented method for providing catastrophe analysis includes (i) causing, via one or more processors of a computing server, a client device to receive an exposure map layer including insurance policy counts and one or more wind speed bands depicting geographical areas receiving or predicted to receive winds; (ii) causing, via the one or more processors, a filter graphical user interface and the one or more wind speed band map layers to be displayed in a map graphical user interface; (iii) receiving, via an input/output user interface, an input of a user; and (iv) causing, based on the input of the user, the map graphical user interface to be updated.

In yet another aspect, a computer-implemented method for performing catastrophe analysis includes (i) receiving, via an electronic network, in a user application of the computer, an exposure map layer including insurance policy counts and one or more wind speed bands depicting geographical areas receiving or predicted to receive winds; (ii) displaying a filter graphical user interface in a map graphical user interface; (iii) receiving, via an input/output user interface, an input of a user; and (iv) based on the input of the user, updating the map graphical user interface.

BRIEF DESCRIPTION OF THE DRAWINGS

FIG. 5 depicts an example data table application for visualizing aggregated exposure information in a graphical user interface, according to an embodiment.

DETAILED DESCRIPTION

The present techniques include method and systems for visualizing weather data to facilitate a user's understanding of and reaction to catastrophic conditions before, during and after a catastrophic event. Some embodiments of the present techniques may include a graphical user interface (GUI) which allows the user to filter data to produce visualizations and data tables according to various criteria. For example, windspeed data may be received/retrieved periodically or on a streaming (i.e., real-time) basis. The present techniques may associate the windspeed data with policy holder information according to latitude/longitude, zip code, or another suitable strategy for correlating insurance policies to a location. The user may filter the windspeed and policy holder data to visualize the locations and groups of policy holders whose insured assets may be most severely affected by the catastrophe, and to visualize various windspeed conditions across multiple product lines, and various geographic areas.

The present techniques allow the user to zoom in to particular regions, to view specific policy counts at the county level, or more granularly in some embodiments. The present techniques allow the user to quickly generate and share maps (e.g., via email) to quickly inform colleagues of changing conditions and potential impacts, which is of critical importance during an impending or ongoing catastrophic event. The present techniques also include methods and systems for deploying unmanned aerial vehicles (i.e., drones) to capture the state of many insured assets both before and in the immediate aftermath of a catastrophic event, much more quickly and inexpensively than teams of human inspectors could perform the same function. The present techniques also allow users to set up alerts and to be notified when certain catastrophic conditions are met.

Example Computing Environment

Figure 1:
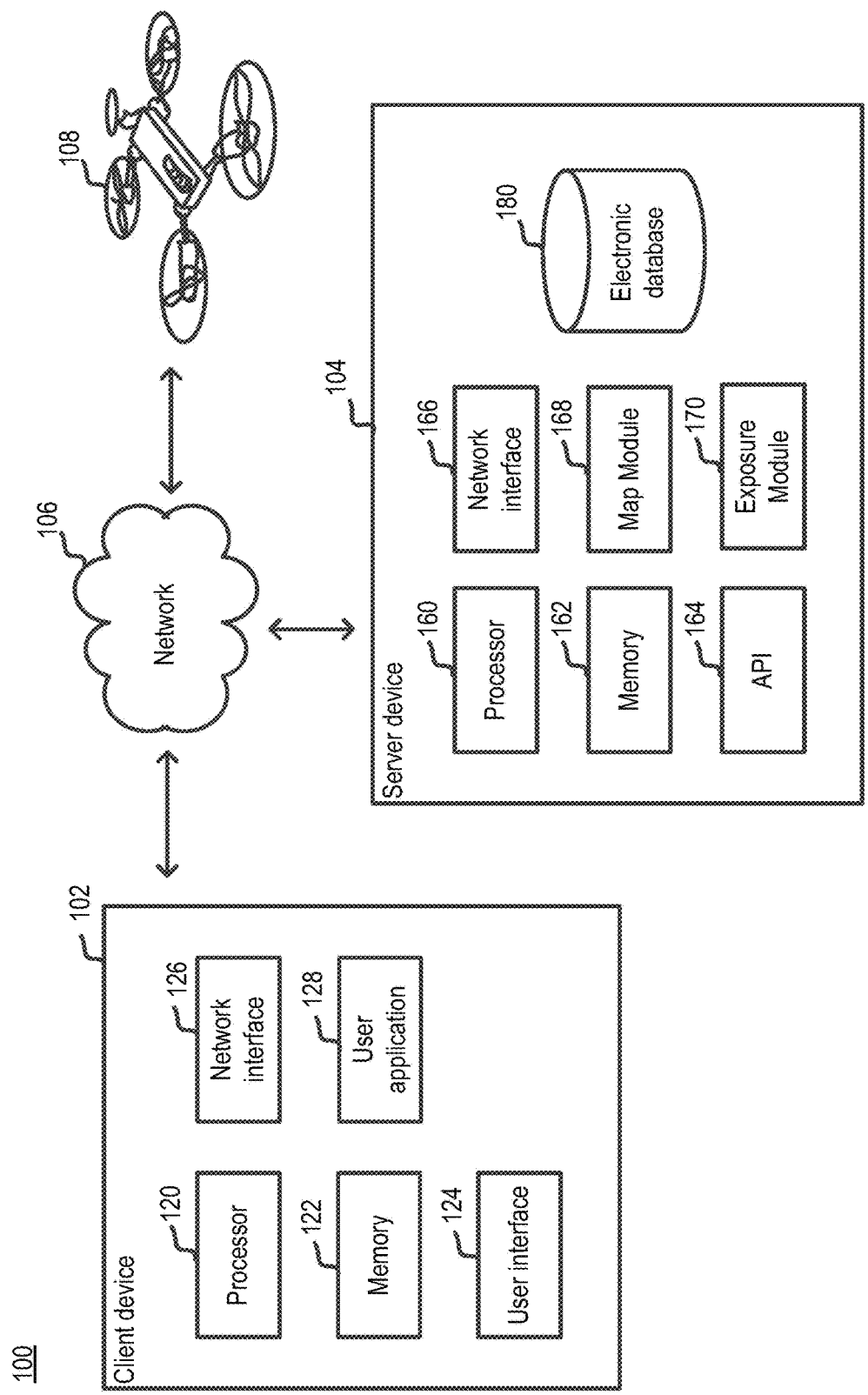
FIG. 1 depicts an example environment for implementing a catastrophe visualization system.

FIG. 1 depicts an example environment 100 for implementing catastrophic weather information. The environment 100 may include a client device 102 associated with a server device 104, a network 106, and an unmanned aerial vehicle (UAV) 108.

The client 102 and the UAV 108 are remote from the server 104 and are coupled to the server 108 via the network 106. The network 106 may include any suitable combination of wired and/or wireless communication networks, such as one or more local area networks (LANs), metropolitan area networks (MANs), and/or wide area network (WANs). As just one specific example, the network 106 may include a cellular network, the Internet, and a server-side LAN. As another example, the network may support a cellular (e.g., 4G) connection to a mobile device of a user and an IEEE 802.11 connection to the client 102. While referred to herein as a "server," the server 108 may in some implementations, include multiple servers and/or other computing devices. Moreover, the server 108 may include multiple servers and/or other computing devices distributed over a large geographic area (e.g., including devices at one or more data centers), and any of the operations, computations, etc., described below may be performed in by remote computing devices in a distributed manner.

The client 102 may include hardware and software components. For example, the client 102 may be implemented using a mobile computing device (e.g., a smart phone). The client 102 may include computer-executable instructions for retrieving/receiving data for rendering in a graphical user interface (GUI) and/or rendered GUI elements (e.g., images, widgets, executable code, etc.). In some cases, the client 102 may be implemented in a laptop or server device. The client 102 may include a processor 120, a memory 122, an input/output user interface 124, a network interface 126, and a user application 128. The processor 120 may be a single processor (e.g., a central processing unit (CPU)), or may include a set of processors (e.g., a CPU and a graphics processing unit (GPU)). The client 102 may include further components.

The memory 122 may be a computer-readable, non-transitory storage unit or device, or collection of units/devices, that may include persistent (e.g., hard disk) and/or non-persistent memory components. The memory 122 may store instructions that are executable on the processor 120 to perform various operations, including the instructions of various software applications (e.g., the user application 128) and data generated, received and/or retrieved by such applications. In the example implementation of FIG. 1, the memory 122 stores at least a user application 128. Generally, the user application 128 is executed by the processor 120 to facilitate bidirectional transmission of user interface data between the client 102 and the server 104 (e.g., receiving visualization data from the server 104, sending user interface events/inputs to the server 104, etc.).

The user interface 124 includes hardware, firmware and/or software configured to enable a user to interact with (i.e., both provide inputs to and perceive outputs of) the client 102. For example, the user interface 124 may include a touchscreen with both display and manual input capabilities. Alternatively, or in addition, the user interface 124 may include a keyboard for accepting user inputs, and/or a microphone (with associated processing components) that provides voice control/input capabilities to the user. The user interface 124 may include a combination of peripheral devices (e.g., a keyboard and mouse) and one or more display screens. In some embodiments, the client 102 may include multiple different implementations of the user interface 124 (e.g., a first user interface 124 for displaying wind speed information, a second user interface 124 for displaying exposure, and/or a third user interface 124 for displaying windspeed and exposure information in a combined format).

The network interface 126 includes hardware, firmware and/or software configured to enable the client 102 to exchange electronic data with the server 104 via the network 106 via a wired and/or wireless connection. For example, the network interface 126 may include a cellular communication transceiver, a WiFi transceiver, transceivers for one or more other wireless communication technologies (e.g., 4G), a wired Ethernet adapter, etc.

In some embodiments, the user application 128 (or other software stored in the memory 122) provides functionality for receiving/retrieving visualization data from the server 104 and for sending user inputs to the server 104. For example, if the client 102 is a smartphone, the user application 128 may be an application specific to a particular mobile computing platform (e.g., an Android, iPhone or other device). The user application 128 may include computer-executable instructions for rendering one or more GUI screens via the user interface 124, receiving/retrieving information (e.g., map data) and for displaying the information in the GUI screens. The GUI screens may be interactive and may allow the user to perform various functions. For example, the user application 128 may allow the user to zoom by, for example, using gestures of one or more of the user's digits. The user application 128 may allow the user to zoom using a scroll wheel of a mouse, or via a GUI element (e.g., a plus/minus element corresponding to zoom level). The GUI may accept keystroke and mouse input events of the user, and may process the events (e.g., to change the zoom level of a map displayed in one of the GUI screens) and/or transmit the events to a server for processing. The user interface 124 may perform the low-level task of receiving the user's input events from a device (e.g., a touch screen) and may dispatch those events to the user application 128 for processing. In some cases, the events may be associated with particular input fields of the GUI (e.g., a textual input field) which the user application 128 may use to take specific actions relating to the GUI. For example, the GUI may include filter fields, wherein the user application 128 analyzes the filter inputs to analyze or restrict information retrieved from the server 104 and displayed in the user application 128 via the user interface 124. In an embodiment, the user application 128 may be implemented in an open source package that provides a framework for building interactive applications (e.g., R Shiny or another interface to the R programming language). In general, the user application 128 allows a user to access the features of the user application 128 without performing any programming.

The server 108 may include hardware and software components. For example, the server 108 may be implemented using one or more server devices. The server 108 includes a processor 160, a memory 162, an application programming interface (API) 164, a network interface 166, a map module 168, an exposure module 170, and an electronic database 180. The server 104 may include further components. The server 108 may include computer-executable instructions for retrieving/receiving data relating to various phenomena (e.g., hurricane wind speed data, hurricane path data, storm data, etc.) and insurance data (e.g., claims data, coverage data, etc.). The server 108 may also include instructions for receiving requests from the client 102 via the network 106 for particular data, including one or more filter parameters. The server 108 may retrieve data via the API 164 and/or the database 180.

The processor 160 may be a single processor (e.g., a central processing unit (CPU)), or may include a set of processors (e.g., a CPU and a graphics processing unit (GPU)). The memory 162 is a computer-readable, non-transitory storage unit or device, or collection of such units/devices, that may include persistent (e.g., hard disk) and/or non-persistent memory components. The memory 162 may store data generated and/or used by the API 164, the map module 168, and the exposure module 170, for example.

The API 164 may include resources provided by a public entity (e.g., the National Oceanic and Atmospheric Administration (NOAA)) and the Federal Emergency Management Agency (FEMA) or a private entity (e.g., Aon plc.). The API 164 may include APIs providing a catastrophe data set. The catastrophe data set refers to one or more data sets from multiple different providers. For example, the catastrophe data set may include weather information generated via direct meteorological measurement (e.g., windspeed obtained via one or more anemometer) and/or weather information predicted using a computer model (e.g., a prediction of a track of a hurricane within a cone of uncertainty). The catastrophe data set provided by API 164 may include data from one or more APIs implemented using suitable API protocols (e.g., representational state transfer (REST), simple object access protocol (SOAP), etc.). For example, the API 164 may include bindings to a proprietary windspeed API owned by a commercial vendor implemented in SOAP protocol. The API 164 may also include bindings for retrieving geographic information system (GIS) data from the National Hurricane Center (NHC) of the NOAA, encoded in keyhole markup language zipped (KMZ) format. The API 164 may enable access to a proliferation of catastrophe data sets and weather data sources in various formats.

The API 164 may provide access to many types of catastrophe data sets, including but not limited to weather data. For example, hurricane-related data sources available to the modules of the server device 104 via the API 164 includes, without limitation, advisory forecast track data, cone of uncertainty data, watches and warnings, forecast wind radii data, precipitation data, preliminary best track data, arrival time of tropical storm force winds, geographical tropical weather outlook data, wind speed probabilities data, probabilistic storm surge data, potential storm surge flooding/inundation data, flood zone maps, historical hurricane insurance loss maps/data, etc. Wind speed probabilities data may include current, predicted or historical wind speeds at a series of coordinate points within a geographic area. For example, the wind speed probabilities data may be a data set including a set of latitude/longitude coordinate pairs, wherein each pair is associated with a list of wind speed/probability pairs. The probabilities may be represented using percentages, values between 0 and 1, or other suitable formats. For example, the wind speed probabilities data set may be structured as follows:

[[25.7917N, 80.1918W]: [10 mph: 10%, 20 mph: 10%, 30 mph: 15%, 40 mph: 20%, 50 mph: 40%, 60 mph: 60%, 70 mph: 80%, 80 mph: 90%, 90 mph: 85%, 100 mph: 75%, 110 mph: 50%, 120 mph: 30%, 130 mph: 10%, 140 mph: 5%], [ . . . ]]

The client 102 and server 104 may access the wind speed probabilities data set to determine the probability of a given wind speed at a particular latitude/longitude coordinate pair.

Access to catastrophe data sets may enable the API 164 to access forecast data from short future periods (e.g., 15 minutes) to several days in the future. Access to such data sets may also provide the API 164 with current/realtime data, as well as past weather and climate data. In some embodiments, the API 164 may provide access to information related to large-scale emergent phenomena other than weather, such as insect infestation maps, drought maps, wildlife herds, etc.

The network interface 166 includes hardware, firmware and/or software configured to enable the server 104 to exchange electronic data with the client 102 via the network 106 via a wired and/or wireless connection. For example, the network interface 166 may include a cellular communication transceiver, a WiFi transceiver, transceivers for one or more other wireless communication technologies (e.g., 4G), a wired Ethernet adapter, etc.

The map module 168 is generally configured to generate maps for display in the client 102. For example, the map module 168 may generate one or more maps corresponding to an area of interest (e.g., a latitude/longitude, county, state, city, etc.) provided by a user of the client device 102. The map module 168 may retrieve/receive map layers from a map layer database based on coordinate information received from the client device 102 (e.g., using latitude and longitude parameters input into the user application 128 by the user) or may generate map layers. The map module 168 may transmit the map layer(s) to the user application 128. The map module 168 may appended a first map layer atop a second map layer, to create a single map layer.

In an embodiment, the map module 168 may obtain map layers and/or other information related to vehicle operation via an application programming interface (API) such as the API 164. For example, the map module 168 may obtain mapping and other information (e.g., terrain maps, political maps, etc.) from a commercial or public mapping API. In general, a map "layer" is an abstraction that includes map data (e.g., coordinate points, lines, areas (polygons) representing classes of real-world entities such as places, roads, elevations, bodies of land and water, etc.). The map layer may include symbols and text labels and metadata specifying how the map data is to be displayed in a client device such as client 102. The map module 168 may generate maps that include coordinate points (e.g., latitude and longitude points) or map layers retrieved/received from other components (e.g., the exposure module 170). Each coordinate point may be associated with particular data (e.g., a count of policy holders on or around the coordinate point) and may be coded according to a color or pattern. The API 164 may provide relay access to external APIs via a series of data access protocols (e.g., GeoJSON, ATOM, etc.).

The exposure module 170 may access proprietary exposure data. For example, the exposure module 170 may access an internal data source of insurance policies relating to one or more class of insurance policies (e.g., vehicle insurance, homeowners insurance, sewer/drain riders, condominium unit owners insurance, farm/ranch insurance, personal articles policies, flood insurance, renters insurance, business insurance policies, etc.). The exposure module 170 may analyze cyclical weather patterns (e.g., the time of year in which hurricanes typically occur) for underwriting purposes (e.g., to determine whether an asset is more or less risky to insure). The exposure model 170 may access coverage limits, replacement costs, discounts, deductibles, etc. with respect to each class or type of insurance. In some embodiments, the server 104 may store proprietary information relating to risk exposure in the database 180. The exposure module 170 may include instructions for overlaying exposure data in map layers generated by the map module 168, as discussed below.

The database 180 may be any suitable database (e.g., a structured query language (SQL) database, flat-file database, key/value store, or a proprietary database or legacy system of an insurer). The database 180 may store customer information in association with policies held by customers, and may allow other components (e.g., the exposure module 170) to query the customer/policy data programmatically. For example, the exposure module 170 may query the database 180 to retrieve a list of all homeowner policy holders in Pinellas County, Florida whose homes were built before 1996. The database 180 may allow such queries to be aggregated/rolled up, to generate counts and other groupings according to complex query criteria. The map module 168 may use such counts and/or aggregations to generate maps, as discussed below.

The UAV 108 may be any suitable unmanned aerial vehicle, such as a commercially-available drone. In some embodiments, one or more UAV 108 (e.g., a fleet of UAVs) may be deployed. The server 104 may control the UAV 108 remotely and/or the UAV 108 may fly according to a pre-programmed flight path installed in a memory unit of the UAV 108. The UAV 108 may be equipped with one or more camera, capable of collecting still photographs and/or video data (e.g., an MP4 stream). The predetermined/preprogrammed flight path may cause the UAV 108 to photograph an insured asset of a policy holder (e.g., a particular domicile, business, vehicle, farm, etc.). The UAV 108 may store the photographs/video in a storage device of the UAV 108 and/or transmit the photographs/video (e.g., via a cellular network included in the network 106) to a remote device (e.g., to the server device 104). The server 104 may associated the photographs/video captured by the UAV 108 with a particular customer and/or policy stored in the database 180.

In operation, the user accesses the user application 128 via the user interface 124 of the client 102. The user may be interested in visualizing data related to a catastrophic event (e.g., a tornado, hail storm, hurricane, drought, etc.) that is in the past, ongoing, or in the future. Generally, catastrophes affect many (e.g., thousands) of customers and may occur in rapid succession. For example, in October 2018, two major hurricanes affected the Southeast U.S. in less than one month (i.e., Hurricane Florence and Hurricane Michael).

The user application 128 provides the user with one or more GUI screen. The user application 128 may include executable instructions for displaying information (e.g., maps, map layers, data tables, etc.) received from the server 104. The GUI depicts a map of the geographic area with which the catastrophic event is associated. The GUI also provides the user with the ability to enter filter parameters to restrict the visualization portrayed in the GUI according to a number of criteria (e.g., policy type, exposures, U.S. state, etc.). The GUI may include certain catastrophe-specific criteria, in some embodiments. For example, as discussed below, a hurricane-specific GUI may include controls for filtering the output according to wind speed. The user may submit a set of filters via the network 106 to the server 104. The client 102 may submit the user's filters automatically (e.g., whenever the user types information into a text box, the user application 128 automatically submits an HTTP request) or upon the user's initiation (e.g., when the user presses a submit button, for example. The server 104 may receive the filters and the map module 168 of the server 104 may retrieve catastrophe data from the API 164, and exposure data from the exposure module 170. The server 104 may correlate the catastrophe data and the exposure data by, for example, joining the catastrophe data and exposure data according to an identical or similar geographic marker.

For example, the catastrophe data may include wind speed probabilities for a set of latitude/longitude coordinate pairs, or arranged according to another geographic marker (e.g., wind speed probabilities for a plurality of zip codes). The server 104 may filter the catastrophe data according to any applicable filters, as specified by the user. The server 104 may generate a combined data set. For example, to continue the above example, for the latitude/longitude coordinate pair of [25.7917N, 80.1918W], the server may use a geo-location search to select all customer policies from the electronic database 180 within a given radius (e.g., 100 meters) of the coordinate pair, within a given state and/or within a polygonal search area.

The server 104 may filter the customer policies (e.g., by adding a WHERE clause to a query of the electronic database 180). The radius chosen may depend on the resolution/precision of the latitude/longitude coordinate pairs. Once each coordinate pair is associated to a set of customer policies in the combined data set, the customer wind speed probabilities for each policy are known. In some cases, a data management module (not depicted) may be included in the server 104 for performing the correlation and data set combination operations discussed above.

In some cases, the user application 128 may include pre-programmed filters for specific GUI screens. For example, a hurricane GUI screen may include a pre-programmed filter for highest risk dwellings, wherein the filtering criteria includes homes built prior to 1994, having an asphalt shingle roof, within 100 meters of the coastline. The user application 128 may include instructions for periodically and/or continuously receiving map data (e.g., a map layer) from the map module 168 and for automatically updating the user interface 124 displayed to the user. In this way, prior to and during a catastrophic event, a user may view the development of a catastrophic event in realtime. The user interface 124 may also have facilities for replaying historical data and for seeking backwards through map layers in the recent past (e.g., in the last 24 hours) and in the future using predicted data.

Example Wind Speed Visualization Embodiment

Figure 2:
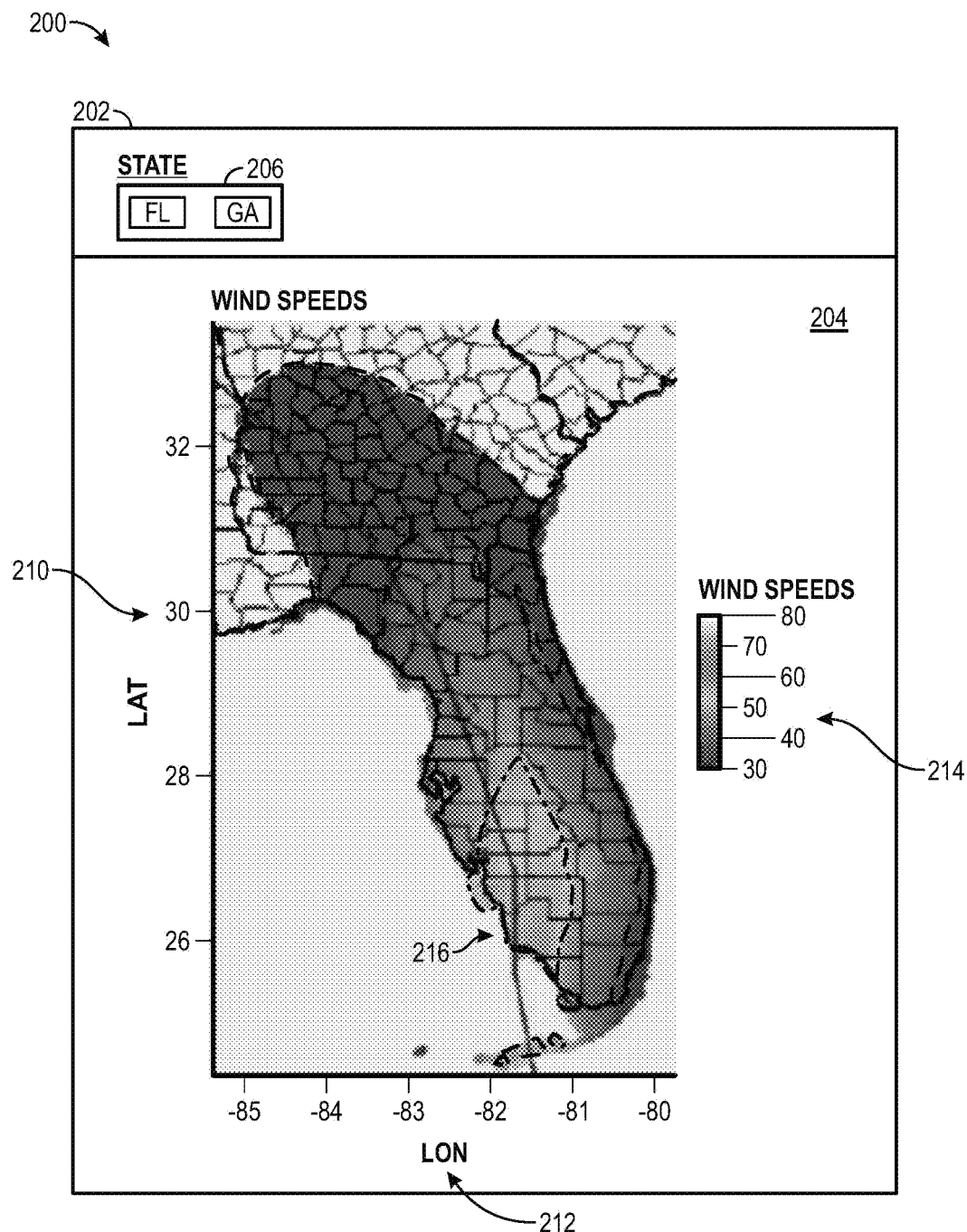
FIG. 2 depicts an example application for visualizing windspeed information and a hurricane path in a graphical user interface, according to an embodiment.

FIG. 2 depicts an example hurricane wind speed visualization application 200, according to an embodiment. Application 200 may correspond to user application 138, for example. Application 200 includes a filter GUI 202 and a map GUI 204. Filter GUI 202 allows the user to specify criteria relating to the map GUI 202. For example, filter GUI 202 allows the user to restrict the map GUI 204 to include data of only one or more states using a state selection filter 206. In an embodiment, additional filters may be added to the filter GUI 202, such as a county filter. The available states/counties may depend on those affected by the hurricane that is the subject of the visualization application 200. For example, the application 200 may limit those states listed in the state selection filter 206 to those in which a hurricane is currently or imminently occurring. It should be noted that portions of Alabama and South Carolina are depicted; however, no catastrophe data is shown in those regions. In an embodiment, a default map GUI 204 may be displayed. In other embodiments, the map GUI 204 may not include any wind speed information until the user makes a selection. Once the user has made a selection, a client device (e.g., the client 102) may retrieve and display catastrophe data in the map GUI 204 (e.g., a wind speed layer).

The map GUI 204 may include a latitude axis 210 and a longitude axis 212, and a wind speed legend 214 by which the content of the map view 204 is coded (e.g., a color or pattern may be used to show a range of different wind speeds). The map GUI 204 may also include a path indicator 216. The path indicator 216 may correspond to an historical or predicted path of a hurricane, and the map GUI 204 may include a map layer depicting higher wind speeds alongside, or adjacent to, to the path indicator 216, reflecting the rotational effects of the storm as the eye of the storm moves along the path. As noted above, the user may zoom the map GUI 204 using pinch-to-zoom gestures (e.g., in a mobile computing device) or via another suitable mechanism, to zero in on a particular county, polygonal region, or other subpart of the map GUI 204. For example, as discussed below, the filter GUI 202 may prompt the user to enter specific latitude and longitude values for zooming in to the map GUI 204 or another map GUI.

In an embodiment, the application 138 may generate the filter GUI 202 and the map GUI 204. The wind speed legend 214, wind speed data displayed in the map GUI 204 layers, and/or the path indicator 216 may be one or more layer retrieved from the server 104 (e.g., from the map module 168 and/or the API 164). The application 200 may be displayed in a mobile computing device (e.g., in an application installed in a smart phone) or served to a user via a web server (e.g., a web server installed in the server 104). In some embodiments, the server 104 and/or the client 102 may load wind speed data from a tagged image file format (.TIFF) file, and hurricane path data from a comma-separated value (.CSV) file. In other embodiments, the data may be combined and loaded together. Although not depicted in FIG. 2, the visualization application 200 may include controls for setting a minimum wind speed, as discussed with respect to FIG. 3, such that when the user selects a minimum wind speed, the visualization application 200 updates the map GUI 204 layers to highlight/display only wind speeds above the selected minimum wind speed.

Example Exposure Visualization Embodiment

Figure 3:
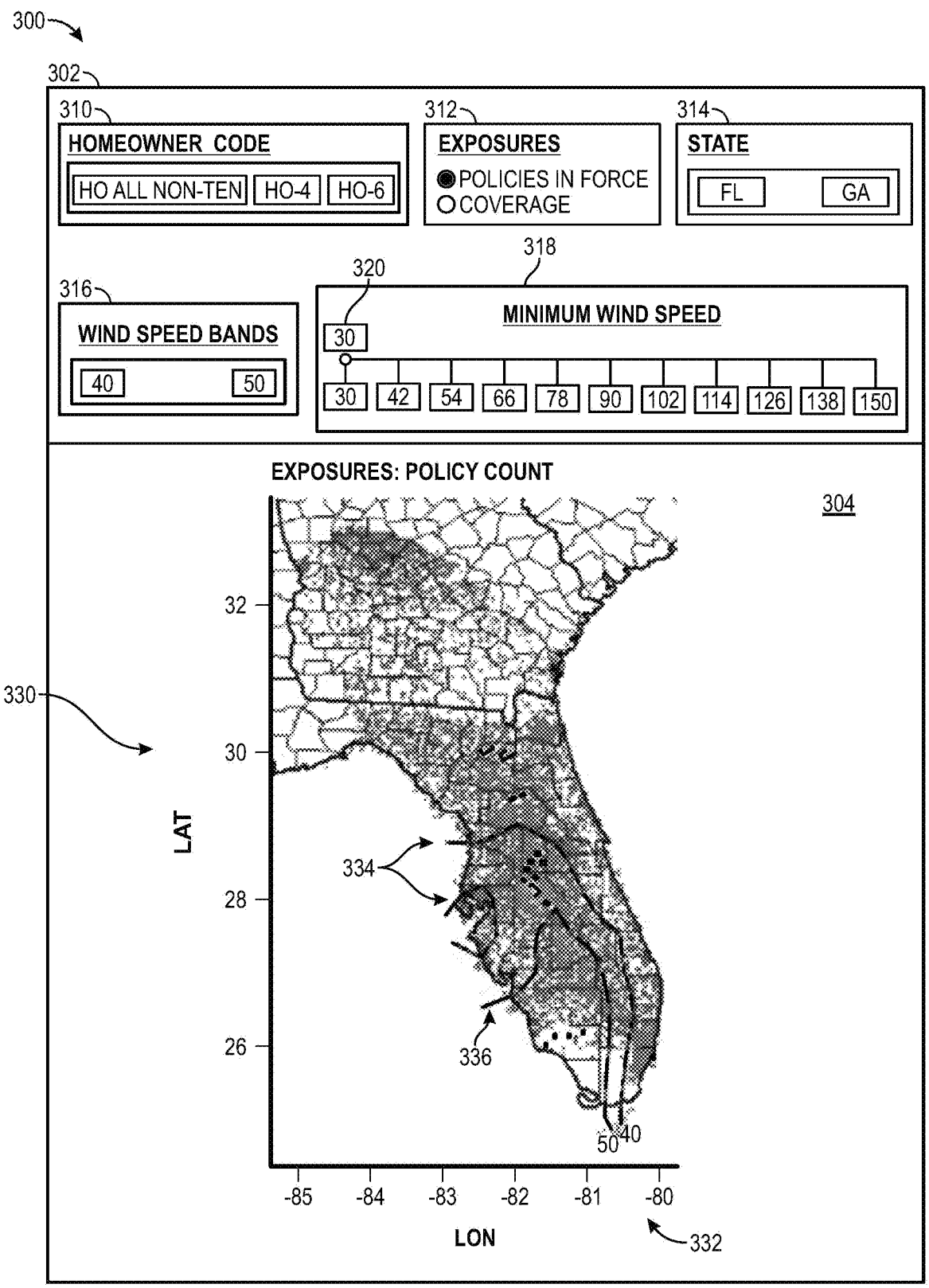
FIG. 3 depicts an example application for visualizing exposure information in a graphical user interface, according to an embodiment.

FIG. 3 depicts an example hurricane exposure application 300 for visualizing exposure data and catastrophe data, according to an embodiment. Application 300 may correspond to user application 138, for example. Application 300 includes a filter GUI 302 and a map GUI 304. The filter GUI 302 allows the user to specify a set of filter criteria restricting the display of catastrophe and/or exposure data. For example the user may access the filter GUI 302 to restrict the policy type of the data displayed according to a policy type filter 310. In the depicted embodiment, the policy type filter 310 includes an all homeowners non-tenant filter, which may correspond to policies that are of homeowner type, excluding non-tenant policies. In the depicted embodiment, the policy type filter 310 also includes a HO-4 policy, which may correspond to a renter's policy, and an HO-6 policy corresponding to a condominium insurance policy. The filters may allow the user to type in information which is autocompleted. For example, the policy type filter 310 may allow the user to type a homeowner code. When the user types the letter "H" in the policy type filter 310, the filter GUI 302 may display a menu including all homeowner codes including the letter "H" and allowing the user to select from among them.

In addition to homeowner code, the hurricane exposure application 300 may allow the user to enter and/or select from additional filters. For example, an additional graphical user interface widget (not depicted) may allow the user to filter according to one or more of the following: a deductible, a construction type, the year the home was built, the type of roof associated with the home, etc. The user may select from multiple filters and after doing so, the application 300 will only display those policies meeting the filtering criteria.

Other types of filters are envisioned, and may vary according to the insurance policy type. The filter GUI 302 includes a policy status selection element 312 allowing the user to winnow the results displayed in the map GUI 304 according to whether the policy is paid up and active (e.g., premiums are paid). The filter GUI 302 also includes a state selection filter 314 allowing the user to restrict the map GUI 204 to include data relating to only one or more states (Florida and Georgia in the depicted embodiment). It should be noted that portions of Alabama and South Carolina are depicted; however, no exposure data or catastrophe data is shown in those regions.

In the depicted embodiment, application 300 includes a hurricane exposure visualization, and therefore, the filter GUI 302 includes a wind speed bands filter 316 wherein the user may specify multiple lower bound values for windspeed bands to be displayed in the map GUI 304. The map GUI 304 may display wind speed bands in the map GUI 304 via a wind speed band map layer. The filter GUI 302 also includes a minimum wind speed slider 318 that the user may use to set a minimum wind speed value 320. In the depicted embodiment, the user has selected a minimum wind speed value 320 of 30 units. (In application 300, the wind speed values may be represented in any suitable unit (e.g., miles per hour, knots, etc.)). In other embodiments, the wind speed filter 316 and the minimum wind speed slider 318 may be replaced, or used in conjunction with, other catastrophe-specific GUI elements. For example, a tornado exposure visualization may include alternate GUI elements.

The map GUI 304 includes an exposure map having a latitude axis 330 and a longitude axis 332. The exposure map includes policy counts for each point of latitude 330 and longitude 332, as depicted by the dotted regions. The exposure map includes only those policies in force in the states of Florida and Georgia, as specified by, respectively, the policy status selection element 312 and the state selection filter 314. Of course, a denser exposure map may result by user's the removal of some filters. The exposure map includes a first set of wind speed bands 334 corresponding to wind speeds of 40 units and a second set of wind speed bands 336 corresponding to wind speeds of 50 units. The first set of wind speeds and the second set of wind speeds are specified by the user in the wind speed bands filter 316. The user may also use the minimum wind speed slider 318 to set a minimum wind speed, from 30-150 units. In some embodiments, the unit of the minimum wind speed slider 318 may be replaced by another designation (e.g., a category 1-5 designation using the Saffir-Simpson scale, or a scale based on another variable such as barometric pressure).

In an embodiment, another exposure option may be included which shows coverages-in-force for back-up and sewer and drain insurance policies. When the user selects this exposure option, the map GUI 304 displays the number of customers who have back-up sewer and drain coverage. It should be appreciated that graphical user interface controls may be included which allow the user to toggle the display of customers on and off, according to various criteria (e.g., whether the customers have flood insurance).

It should be noted that the coordinate points depicted in the exposure map of the map GUI 304 are coded according to the policy counts at those respective coordinate points. The wind speed bands depict the areas receiving (or predicted to receive) winds at a given level. Therefore, the user may view the exposure map to determine the areas where winds of a certain level will affect a concentration of customer policies. The user may use the exposure map to determine the most at risk (e.g., highest concentration of policies, highest wind speeds) and least risk (e.g., lowest concentration of policies, lowest wind speeds) regions. Thus, the map GUI 304 provides the user with information that is not available by viewing either the wind speeds map of FIG. 2 or a map of policy counts in isolation. Moreover, the ability of the user to zoom in to view exposure at a granular level (e.g., at a neighborhood or street-by-street level) allows the user to very quickly determine policy risks at a level that is heretofore not possible. It should also be noted that although FIG. 2 and FIG. 3 depict two separate applications, in some embodiments, the application 128 of FIG. 1 may include a single application, in which both a wind speed map GUI and an exposure map GUI are displayed (e.g., in a side-by-side display).

Example Exposure Map Zoom Embodiment

Figure 4:
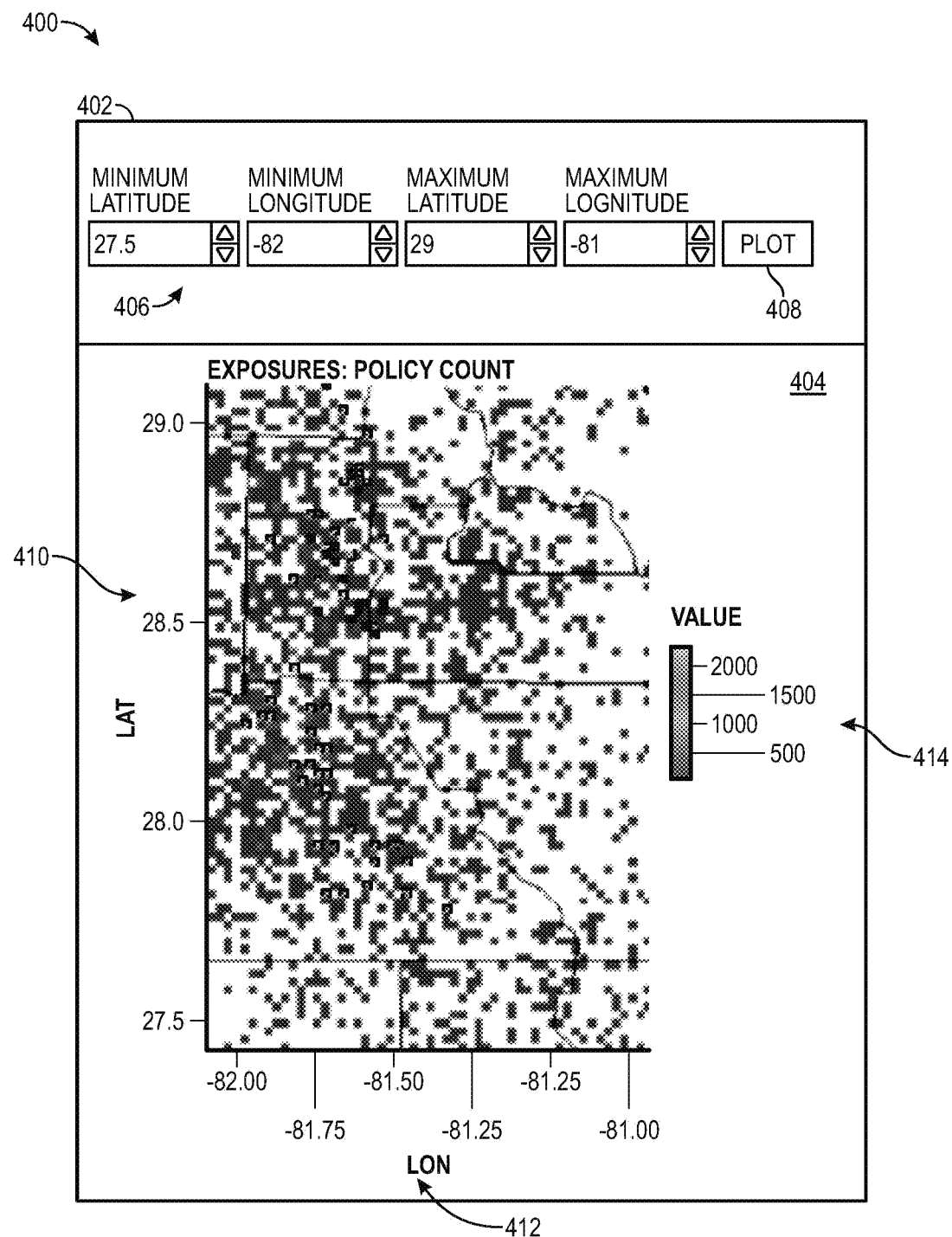
FIG. 4 depicts an example application for visualizing zoomed exposure information in a graphical user interface, according to an embodiment.

FIG. 4 depicts an example zoomed application 400 of a hurricane exposure map, such as the exposure map depicted in the map GUI 304 of example hurricane exposure application 300, according to one embodiment. The zoomed application 400 may include a zoom filter 402 and a zoomed region 404 including an exposure map. As noted above, users find the ability to zoom in to view the maps disclosed herein in granular detail to be highly advantageous in assessing current or future exposure relating to catastrophic events. For example, a user viewing the exposure map of FIG. 3 may note that the 50-unit wind band encompasses a region including several counties. For example, the user may want to focus on those counties in Florida that are South of Marion and Volusia counties, West of Brevard, East of Hillsborough, and North of Okeechobee. To accomplish this, the user may use a set of latitude and longitude inputs 406 of zoom filter 402 to specify latitude and longitude bounds for the exposure map of the zoomed region 404.

Once the user has typed in latitude and longitude parameters into the set of latitude and longitude inputs 406, the user may press a plot button 408 to cause a zoomed exposure map corresponding to the typed latitude and longitude parameters to be displayed in the zoomed region 404. In an embodiment, the user's entry of valid latitude and longitude parameters may cause the zoomed exposure map to automatically render. The zoomed region 404 may include a latitude axis 410, a longitude axis 412 and a value legend 414. The value legend 414 may include a range of risk values. In the depicted embodiment, the risk values are denominated according to the count of active policies within a given area. In some embodiments, other suitable metrics may be used, such as a risk quotient (e.g., a decimal value between 0 and 1) or a dollar value based on attributes of individual policies. The zoomed region 404 may include one or more data points corresponding to the value legend 414 which are coded according to the risk level. The zoomed region 404 may include one or more U.S. states.

By viewing the zoomed exposure map, the user may quickly assess the level of risk at a zoomed level. In some embodiments, the zoom level may allow the analyst to click on the data points. When the user clicks on a data point, the user application 128 may request information from the map module 168 relating to the point and display that information in a point display GUI (not depicted). For example, the address and/or policy number of each customer located in the point may be displayed.

In operation, the user may enter the latitude and longitude parameters into the user interface 124 of FIG. 1 using a keyboard, mouse, and/or touch device (e.g., a touch screen and software keyboard included in a mobile computing device such as a smart phone or tablet). The user application 128 of FIG. 1 may receive the latitude and longitude parameters and an identification of the currently-displayed exposure map. For example, with respect to FIG. 3, the identification of the currently-displayed exposure map may include the states Florida and Georgia, the homeowner codes "HO ALL NON-TEN", "HO-4" and "HO-6" and a policies-in-force designation. The wind speed bands of 40 and 50 units and the minimum wind speed of 30 may also be included in the identification of the currently-displayed exposure map. In some embodiments, the user application 128 may submit the identification of the currently-displayed exposure map along with the latitude and longitude parameters to the map module 168. The map module 168 may then generate a zoomed exposure map and return the zoomed exposure map to the user application 128 for display to the user via the user interface 124. In some embodiments, the user application 128 may include mapping capabilities (e.g., a map module located in the client 102) that may be capable of serving zoomed exposure map and/or a zoomed map layer to the user application 128 without accessing the network 106.

In some embodiments, the user may use a selection tool (e.g., via a mouse or other pointer device, or a touch screen) to encompass a region. The encompassed region may correspond to a polygonal shape, and the polygonal shape may include parameters that the application 128 may transmit to the map module 168. The map module 168 may use the polygonal parameters to identify a map region to zoom. In this way, the map is zoomed without the user specifying an explicit latitude and/or longitude parameter(s).

Additional Embodiments

The above-described techniques may be combined with additional techniques to provide insurers with additional capabilities that are not currently known in the art. For example, the UAV 108 may be launched from a staging location within each of a number of counties of a given region (e.g., in Palm Beach, Broward, and Dade counties in South Florida). The UAV 108 may collect a first set of photographs/video prior to an expected event (e.g., in advance of a hurricane's predicted landfall). The collection may take place periodically. The UAV 108 may be redeployed after the hurricane has passed through an area to collect a second set of photographs/video. After the catastrophic event (e.g., a hurricane, tornado, crop infestation, etc.) the insurer may compare the first set of photographs/video and the second set of photographs/video. The insurer may initiate the comparison in response to a claim received by a policy holder, to determine a cause of loss and to assist in the processing/substantiation of a claim. For example, in the context of a hurricane, the insurer may seek to compare the before and after images to determine whether the damage to a home was attributable to wind damage or flooding. A computer system may be used to determine whether wind or water damage caused the loss by analyzing inundation and/or precipitation maps, historical wind speed data, and policy information. For example, the insurer may analyze the imagery using a model that combines the before and after imagery with additional information (e.g., storm surge maps).

In some cases, losses caused by wind are covered losses, whereas losses caused by water/flooding are not. Therefore, the ability to use the UAV 108 to accurately pinpoint and document the cause of a loss in the immediate aftermath of a catastrophe is a critical capability. As of 2018, some insurers have spent billions of dollars settling claims related to Hurricane Katrina, and yet some insurers are still involved in litigation over claims. Cause of loss determinations are, in fact, one of the most litigious issues that insurers face. The UAV 108 may also result in significant cost savings that the insurer can pass along to customers. For example, an insurer has traditionally needed to hire engineers to determine the primary cause of damage. Contracting with such engineers may not be necessary if the UAV 108 is able to ascertain a primary cause.

In an embodiment, the insurer may deploy an airplane or a multi-rotor UAV 108 (e.g., an Eagle Eye Vision drone). In some embodiments, the insurer may view historical windspeed information and base deployment of the UAV 108, an airplane, and/or human resources on the historical windspeed information.

The insurer may also use the before and after imagery to determine which areas of a given region are most damaged by a catastrophic event and to deploy resources (e.g., claims processors/inspectors) to those regions. For example, an insurer may have a Catastrophe Team comprising a self-sufficient fleet of vehicles, each vehicle servicing scores of individuals. The Catastrophe Team may deploy to an area to assess damage and to help policy holders affected by natural disasters or other catastrophes. The Catastrophe Team may be able to make immediate payments to policyholders to cover initial needs such as housing, transportation and food. The Catastrophe Team may also work with policyholders to assist with long-range repairs or replacements. However, the Catastrophe Team's effectiveness may be limited if not deployed to the most affected region. The present techniques help the Catastrophe Team to make the biggest impact in a post-catastrophe context.

The insurer may use the exposure map before a hurricane to identify regions likely to be most affected (e.g., those regions in the map GUI 304 within the 50-unit wind speed band wherein there is the highest concentration of policy holders). The insurer may prepare/stage resources and base preventative actions in a real-time basis on the exposure map to address ongoing weather-related catastrophes. For example, a claims department may view the wind speed map depicted in FIG. 2 to determine potential damage and to deploy casualty teams in advance of a catastrophe.

The insurer may preemptively contact those policy holders to suggest mitigation efforts, such as the construction of a safe room, to advise the customer regarding the proper tethering of boats during a hurricane, the proper use of a generator, with tips for children during a hurricane, with information regarding how to properly board up windows, to create a digital inventory, etc. The insurer may advise customers predicted to be within the path of the storm to evacuate. After the storm has passed, the insurer may contact the same individuals to provide information related to selecting a roofing contractor and to avoid predatory service providers.

The insurer may also use the before and after imagery to detect fraud. The insurer may use the before and after imagery to proactively make contact with policy holders, to avoid any notification of loss delay that may otherwise cause the policy holder to lose valuable rights. The insurer may use the before and after imagery to determine which areas should be serviced by third-party catastrophe outsourcing companies (e.g., general contractors). Catastrophes may generate many (e.g., hundreds or thousands) of claims, affecting multiple coverage lines (e.g., auto, home, life, etc.) and therefore, prompt communication and cooperation is vital to quick claim resolution.

In some embodiments, an analyst may wish to view raw aggregated values of data to enable the analysis of certain aspects of catastrophe data and exposure data, rather than visualization. FIG. 5 depicts an example data table application 500 for visualizing aggregated raw exposure data in a graphical user interface, according to an embodiment. The application 500 may include a data table 502, a set of aggregation criteria 504, a windspeed minimum input field 506, a search box 508, and navigation user interface controls 510. The data table 502 displays a plurality of rows and columns corresponding to aggregated and filtered data. For example, in the depicted embodiment, the user has used the set of aggregation 504 to select a deductible grouping. Row 1 of the resulting data table 502 depicts 167 policies in force with a 1% deductible, having 52 sewer drain coverages in force. The user has also used the windspeed minimum input field 506 to set the minimum windspeed in the aggregated data table 502 to 60 units (in the depicted embodiment, the unit is miles per hour (MPH)). Each of the columns in the data table 502 is sortable in descending or ascending order, and the user may navigate the data table using the navigation user interface controls 510.

In some embodiments, the data table 502 may include additional graphical user interface features, such as a priority list of top counties/zip codes as measured by wind speed and exposure. The data table 502 may show storm patterns over time, such as how has storm progressed by, for example, the computation of moving averages. The data table 502 may include data relating to tornadoes and hail storms. In addition, the data table 502 may display actual claims data created in the aftermath of a storm, by retrieving data on claims and comparing that data to the final path of storm.

The data table 502 is an important tool for users because it allows users to retrieve total policy counts for varying deductible levels, total coverage amount for those levels, information regarding whether backup sewer/drain coverage is present in those levels, and information about average and maximum wind speeds at those deductible levels. In some embodiments, the user can use the data table 502 and filtering capabilities to display the distribution of other variables in the data table 502 including construction type, roof type, the year the policy holder's house was built, etc.

In some embodiments, the user application 128 may allow the user to set one or more threshold values and to trigger alerts when the threshold values are reached. For example, the user may be interested to know when the average windspeed exceeds 40 mph for a 3% deductible group having 10 or more sewer and drain additional coverage policies. The user may input such criteria via an alert application (not depicted). The user application 128 may transmit the alert criteria to the server 104 in the form of an alert subscription, whereupon the exposure module 170 or another module may store the alert criteria in the electronic database 180. The server 104 may periodically execute instructions that cross-reference alert criteria against exposure information in the exposure module 170, and which generate an alert (e.g., an email, text message, push notification, etc.) and transmit the alert to the user if the criteria are met. In this way, an analyst may be advised of developing conditions of interest without the need to constantly monitor the user application 128.

Example Method

Figure 6:
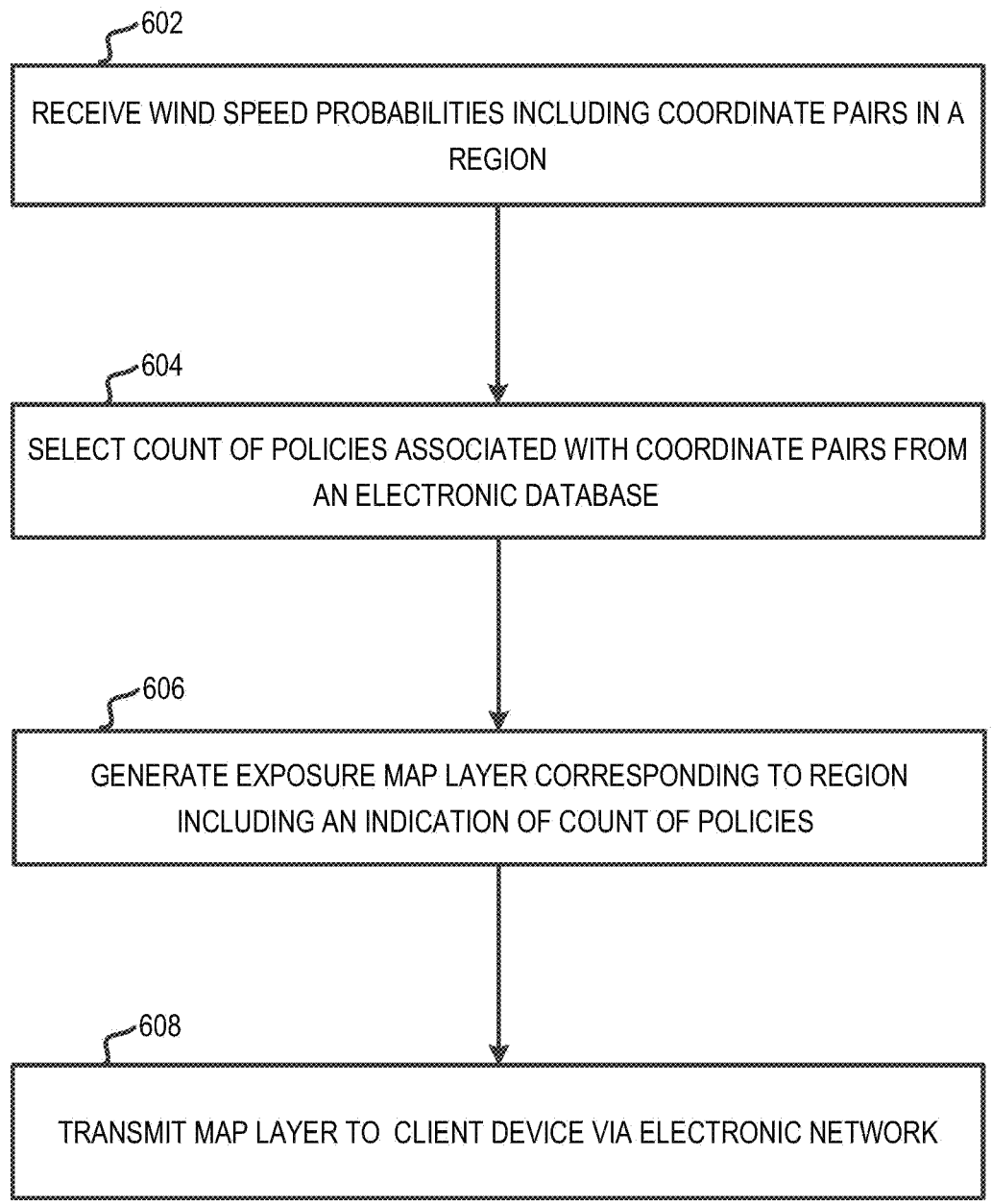
FIG. 6 depicts an example method for of allowing a user to visualize exposure data to facilitate catastrophe analysis according to one embodiment and scenario.

FIG. 6 depicts an example method 600 for allowing a user to visualize exposure data to facilitate catastrophe analysis.

The method 600 may include receiving a wind speed probabilities data set including a set of coordinate pairs in a region, wherein each coordinate pair is associated with a set of wind speed probabilities (block 602). The wind speed probabilities data set may include latitude/longitude pairs (or zip codes, counties, or other suitable geographic identifiers) each associated with a set of wind speed/probability pairs, as discussed above, so that the probability of wind of varying levels at multiple geographic points/regions is known. The map module 168 of the server 104 may retrieve the set of wind speed probabilities data from an API, such as the API 164. A user of the client 102 may filter the wind speed probabilities data set according to various criteria (e.g., the user may specify one or more states using the state selection filter 314 of FIG. 3). In some embodiments, the probabilities data set may include a path, expressed as a set of latitude/longitude points (e.g., a linear set of geographic locations). The set of coordinate pairs may be filtered by the user at the client 102. For example, the user may select a zoomed in region of the overall map, one or more states, or a polygonal region, a minimum wind speed at the client, so that the set of wind speed probabilities will only include those greater than the minimum wind speed, etc.

In some embodiments, the method 600 may include generating and/or displaying a wind speed prediction instead of, or in addition to, wind speed probabilities. For example, the method 600 may generate a prediction of a 50 miles-per-hour wind speed prediction with respect to a geographic point/polygonal region, wherein generating the prediction is based on analyzing the wind speed probabilities data set or another data set.

The method 600 may include selecting, from an electronic database, a count of policies associated with each coordinate pair in the set of coordinate pairs (block 604). The selection may occur after the user has specified a subset of the set of coordinate pairs by filtering. As noted, the method 600 may use a geo-location algorithm to select the count of policies. For example, the method 600 may analyze the address and/or zip code of the policy holder (e.g., service address, billing address, or other address) to determine the distance of the policy from the coordinate pair.

The method 600 may include generating an exposure map layer corresponding to the region including an indication of the count of policies associated with each coordinate pair in the set of coordinate pairs (block 606). The map layer may be map layer encoded in a map layer data format (e.g., a shape file), a static image file including dynamic content, an HTML and JavaScript application, or another suitable format.

The method 600 may include transmitting the map layer to a client device via an electronic network (block 608). The map layer may be transmitted (e.g., via an HTTP request/response) via the network 106. The map layer may include a plurality of points, each corresponding to a count of the number of policies located at or nearby the point on the map. The map layer may include interactivity, so that a user may for example, touch/click or hover over one of the points in the map to retrieve a list of policies comprising the point on the map or to view other aggregated data about the point. For example, the user may interact with one of the points to cause the aggregate risk in dollar terms to be displayed in the user application 128.

Additional Considerations

The following considerations also apply to the foregoing discussion. It should be appreciated that the above techniques, methods and systems may be used by an insurer before, during and after a large-scale catastrophic event to mitigate damage and to harden structures before the event occurs. However, the techniques, methods and systems may be useful to entities other than insurers (e.g., government actors).

Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, the term "set" may include a collection of one or more elements.

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to smart home functionality (or home occupant preferences or preference profiles), and/or insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider.

In one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

What is claimed:

1. A computer-implemented method for analyzing catastrophic events, comprising:
   presenting, via a display of a computing device, a set of graphical user interfaces in one or more screens, comprising a map graphical user interface configured to display a digital map including one or more layers and a filter graphical user interface configured to receive input associated with a plurality of data filters;
   receiving, via the filter graphical user interface, one or more user inputs associated with at least one of the plurality of data filters;
   obtaining, via one or more processors of the computing device, a plurality of map layers based upon the one or more user inputs, including one or more exposure map layers including indications of insurance policies associated with a plurality of policy locations within a map area and one or more wind speed layers including indications of wind speeds at a plurality of wind speed locations within the map area; and
   presenting, via the display, the one or more exposure map layers and the one or more wind speed layers.

2. The computer-implemented method of claim 1, wherein the one or more exposure map layers include a set of insurance policies each associated with a corresponding geographical coordinate point within the map area.

3. The computer-implemented method of claim 2, wherein each insurance policy of the set of insurance policies is selected from a plurality of insurance policies based upon the respective insurance policy meeting filtering criteria indicated by the one or more user inputs.

4. The computer-implemented method of claim 1, wherein the indications of insurance policies associated with the plurality of policy locations within the map area comprise indications of insurance policy counts associated with regions within the map area.

5. The computer-implemented method of claim 1, wherein the one or more wind speed layers comprise one or more wind speed band map layers depicting geographical areas receiving or predicted to receive winds.

6. The computer-implemented method of claim 5, wherein the one or more user inputs include one or more wind speeds associated with the one of more wind speed band map layers.

7. The computer-implemented method of claim 1, wherein obtaining the plurality of map layers comprises:
   transmitting an indication of the one or more user inputs to a server via a communication network; and
   receiving the plurality of map layers from the server via the communication network.

8. The computer-implemented method of claim 1, further comprising:
   presenting, via the display, a data table graphical user interface including a set of aggregation criteria and a data table including a data set aggregated according to at least one of the set of aggregation criteria.

9. A computing system for analyzing catastrophic events, comprising:
   one or more processors;
   a display; and
   one or more memories having stored thereon non-transitory executable instructions that, when executed by the one more processors, cause the computing system to:
      present, via the display, a set of graphical user interfaces in one or more screens, comprising a map graphical user interface configured to display a digital map including one or more layers and a filter graphical user interface configured to receive input associated with a plurality of data filters;
      receive, via the filter graphical user interface, one or more user inputs associated with at least one of the plurality of data filters;

obtain a plurality of map layers based upon the one or more user inputs, including one or more exposure map layers including indications of insurance policies associated with a plurality of policy locations within a map area and one or more wind speed layers including indications of wind speeds at a plurality of wind speed locations within the map area; and present, via the display, the one or more exposure map layers and the one or more wind speed layers.

10. The computing system of claim 9, wherein:

the one or more exposure map layers include a set of insurance policies each associated with a corresponding geographical coordinate point within the map area; and each insurance policy of the set of insurance policies is selected from a plurality of insurance policies based upon the respective insurance policy meeting filtering criteria indicated by the one or more user inputs.

11. The computing system of claim 9, wherein:

the one or more wind speed layers comprise one or more wind speed band map layers depicting geographical areas receiving or predicted to receive winds; and the one or more user inputs include one or more wind speeds associated with the one of more wind speed band map layers.

12. A non-transitory computer-readable medium containing executable instructions that, when executed by one or more processors of a computing system, cause the computing system to:

present, via a display of the computing system, a set of graphical user interfaces in one or more screens, comprising a map graphical user interface configured to display a digital map including one or more layers and a filter graphical user interface configured to receive input associated with a plurality of data filters;

receive, via the filter graphical user interface, one or more user inputs associated with at least one of the plurality of data filters;

obtain a plurality of map layers based upon the one or more user inputs, including one or more exposure map layers including indications of insurance policies associated with a plurality of policy locations within a map area and one or more wind speed layers including indications of wind speeds at a plurality of wind speed locations within the map area; and present, via the display, the one or more exposure map layers and the one or more wind speed layers.

13. The non-transitory computer-readable medium of claim 12, wherein the one or more exposure map layers include a set of insurance policies each associated with a corresponding geographical coordinate point within the map area.

14. The non-transitory computer-readable medium of claim 13, wherein each insurance policy of the set of insurance policies is selected from a plurality of insurance policies based upon the respective insurance policy meeting filtering criteria indicated by the one or more user inputs.

15. The non-transitory computer-readable medium of claim 12, wherein the indications of insurance policies associated with the plurality of policy locations within the map area comprise indications of insurance policy counts associated with regions within the map area.

16. The non-transitory computer-readable medium of claim 12, wherein the one or more wind speed layers comprise one or more wind speed band map layers depicting geographical areas receiving or predicted to receive winds.

17. The non-transitory computer-readable medium of claim 16, wherein the one or more user inputs include one or more wind speeds associated with the one of more wind speed band map layers.

18. The non-transitory computer-readable medium of claim 12, wherein the executable instructions that cause the computing system to obtain the plurality of map layers cause the computing system to:

transmit an indication of the one or more user inputs to a server via a communication network; and receive the plurality of map layers from the server via the communication network.

19. The non-transitory computer-readable medium of claim 12, wherein the executable instructions further cause the computing system to:

present, via the display, a data table graphical user interface including a set of aggregation criteria and a data table including a data set aggregated according to at least one of the set of aggregation criteria.

20. The non-transitory computer-readable medium of claim 12, wherein the executable instructions further cause the computing system to:

automatically obtain real-time updates to the one or more wind speed layers; and automatically update the one or more wind speed layers presented via the display in real time.

* * * * *